Nov. 12, 1963   T. J. BROWNRIGG   3,110,303
COOKING UTENSIL
Filed May 18, 1962
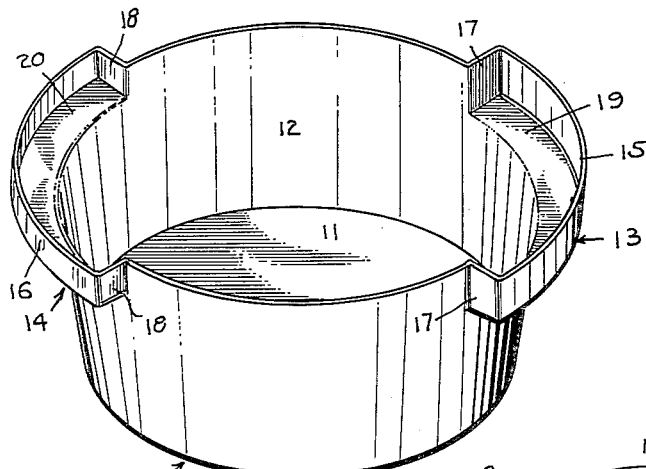
FIG. 1
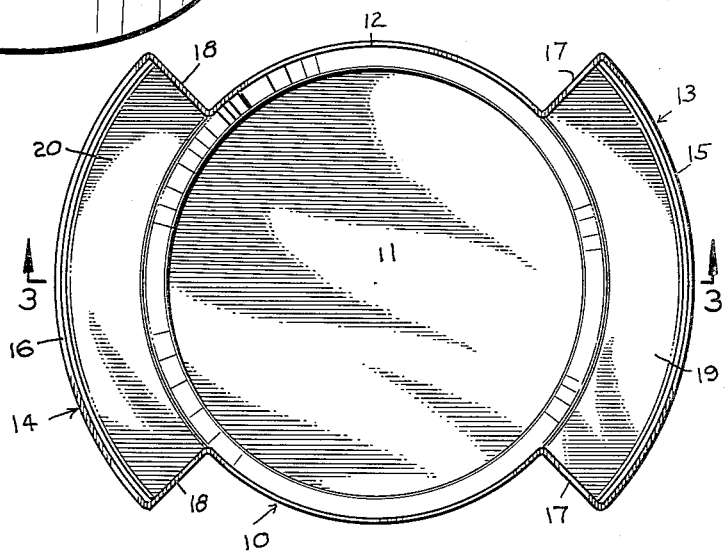
FIG. 2
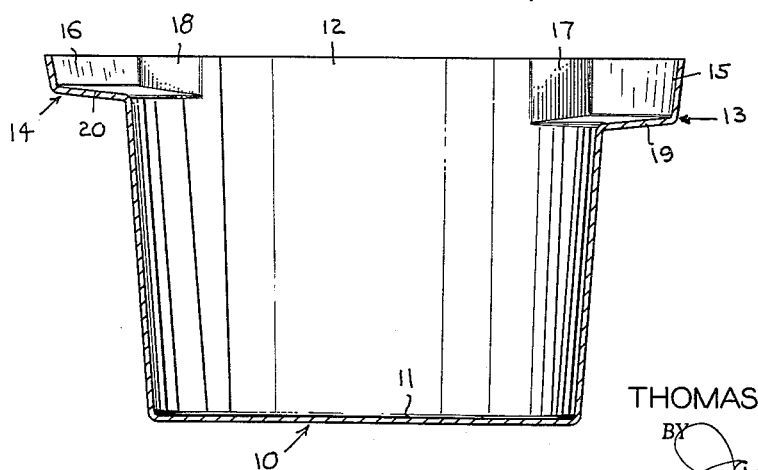
FIG. 3
INVENTOR.
THOMAS J. BROWNRIGG
BY
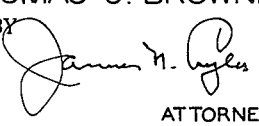
ATTORNEY

3,110,303
COOKING UTENSIL
Thomas J. Brownrigg, West Hollywood, Fla.
(670 SW. 28th Drive, Fort Lauderdale 12, Fla.)
Filed May 18, 1962, Ser. No. 195,683
1 Claim. (Cl. 126—386)

The present invention relates to new and useful improvements in domestic and commercial cooking utensils and has for its primary object to provide a device of this character which embodies unique means for preventing fluids therein from boiling over.

Another very important object of this invention is to provide a cooking utensil of the aforementioned character wherein, when the boiling fluid recedes, the excess fluid will immediately return by gravity to the vessel.

Still another important object of the present invention is to provide an improved cooking utensil of the character described comprising a single piece of suitable metal.

Other objects of the invention are to provide a utensil of the aforementioned character which will be of relatively simple construction, durable, sanitary, attractive in appearance and which may be economically produced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of an improved cooking utensil embodying the present invention;

FIG. 2 is a slightly enlarged plan view thereof, and

FIG. 3 is a section taken on line 3—3 of FIG. 2.

Referring specifically to the drawings, there has been provided a circular downwardly tapered vessel 10 of any suitable dimensions having a bottom wall 11 and the usual circumferential wall 12.

Formed integral with the wall 12 at diametrically opposite points are segmental radial extensions 13 and 14. The extensions 13 and 14 include upstanding concentric walls 15 and 16, end walls 17 and 18 and inwardly and downwardly inclined bottom walls 19 and 20. The extension 14 is relatively shallow as compared to the extension 13, for a purpose to be presently described. A cover, not shown may be employed to cover the top of the vessel and the extensions 13 and 14 during the cooking of certain food products. The top of the walls 15, 16, 17 and 18 terminate flush and in the same plane with the top of the wall 12 of the vessel.

In use, when excessive boiling occurs in the vessel 10 the overflow first enters the relatively deep extension 13 where it has a tendency to cool. If after this occurs, the excessive boiling continues and the capacity of the extension 13 is exceeded, the overflow then enters the extension 14. When the excessive boil ceases and the level of the fluid in the vessel drops, the overflow in the extensions 13 and 14 immediately return by gravity to said vessel to continue the cooking action thus insuring that all of the food products will be fully cooked.

It will be apparent from the foregoing that a very desirable cooking vessel has been employed that will effectively prevent the food product being cooked from boiling over on to the stove and as the excessive boiling enters the extensions 13 and 14, they will be adequately cooled to thus retard any overflow from the vessel and as before stated, when the boiling is reduced in temperature, the overflow from the extensions will automatically drain back to the vessel. The extensions 13 and 14 being upon diametrically opposite sides of the vessel 10 will permit the vessel to be used without interference with other vessels on the stove and will permit the vessel to be positioned closely adjacent some of the well known stove control panels that overhang the cooking area. The device is unique, is highly effective for its purpose, is cheap to manufacture and is easily cleaned. The vessel and its extensions may be manufactured in any suitable manner by casting or molding and of any suitable material, such as aluminum.

It is to be understood that the invention is not limited to the precise construction shown, but that changes are contemplated as readily fall within the spirit of the invention as shall be determined by the scope of the subjoined claim.

Having described my invention what I claim as new and desire to secure by Letters Patent is:

A cooking vessel of the character described to prevent the boiling overflow from the vessel of foods or liquids being boiled therein, the vessel being relatively deep and of circular form open at the its top, the vessel at diametrically opposite points having arcuate and concentric outwardly extending radial extensions, the extensions being hollow and open at their tops, one extension being relatively deeper than the other extension to successively receive the boiling overflow, the extensions having each an outer wall and end walls and with the marginal upper edges of the walls being in the same plane as the open top of the vessel, each of the extensions also having a bottom that is inclined downwardly toward the vessel whereby overflowing fluids will readily drain back into the vessel when the temperature of the vessel contents has been lowered, the extensions communicating with the vessel for their full length, the vessel and the extensions being integrally formed.

References Cited in the file of this patent

UNITED STATES PATENTS

| | | |
|---|---|---|
| 940,672 | Carr | Nov. 23, 1909 |
| 1,518,142 | Gerard-Festenburg | Dec. 9, 1924 |
| 2,141,822 | Porter | Dec. 27, 1938 |

FOREIGN PATENTS

| | | |
|---|---|---|
| 316,854 | Great Britain | Sept. 26, 1929 |
| 734,954 | France | Aug. 13, 1932 |